United States Patent [19]
Mottier et al.

[15] 3,678,399
[45] July 18, 1972

[54] METHOD OF AND APPARATUS FOR ELECTRONICALLY OBTAINING THE ARGUMENT OF A COMPLEX FUNCTION

[72] Inventors: Francois Mottier, Zurich; Peter J. Wild, Wettingen, both of Switzerland

[73] Assignee: Brown, Boveri & Company Ltd., Baden, Switzerland

[22] Filed: Jan. 20, 1971

[21] Appl. No.: 108,078

[30] Foreign Application Priority Data

Jan. 22, 1970 Switzerland ..................868/70

[52] U.S. Cl. .................................328/134, 328/147
[51] Int. Cl. ..................................................H03d 13/00
[58] Field of Search ..............307/232; 328/133, 134, 147, 328/155

[56] References Cited

UNITED STATES PATENTS

3,219,935 11/1965 Katakami..........................328/134 X
3,235,800 2/1966 Turrell................................328/134 X
3,521,173 7/1970 Farley....................................328/134

Primary Examiner—John S. Heyman
Attorney—Norman F. Oblon, Stanley P. Fisher, Marvin J. Spivak and C. Irvin McClelland

[57] ABSTRACT

A method and apparatus are disclosed for precisely recovering the arbitrary argument of an output signal from a transducer having a sinusoidal transfer characteristic. The respective function values of the transducer output are continuously compared with a sinusoidally varying reference voltage of known angular frequency and amplitude. The angular frequency of the reference voltage is set sufficiently high so that the value of the transducer output signal does not change appreciably during a cycle of the reference voltage. The amplitude of the reference voltage is made equal to the maximum possible amplitude of the transducer output signal. From this comparison is derived electronically a pulse-width modulated signal, the width of each pulse being determined by the interval between two points in time at which amplitude equality occurs between the transducer output and the reference voltage during each half-cycle of the reference voltage.

13 Claims, 9 Drawing Figures

METHOD OF AND APPARATUS FOR ELECTRONICALLY OBTAINING THE ARGUMENT OF A COMPLEX FUNCTION

BACKGROUND OF THE INVENTION

1. Field of the Invention

This invention relates generally to a method of and an apparatus for electrically obtaining the arguments of complex signals, and more particularly to a method of and an apparatus for electronically obtaining the argument of a complex signal at the output of a transducer with a sinusoidal transfer characteristic. By a transducer with a sinusoidal transfer characteristic is meant a device in which an input signal $\phi(t)$ is so varied that it appears at the output of the transducer as the argument of a cosine or sine function.

2. Description of the Prior Art

Transducers having sinusoidal transfer characteristics are used, for example, in various optical measurement systems where an unknown argument $\phi(t)$ is sought to be recovered by electronic processing of signals at the transducer output which have the form, $$f(t) = K[1 + \cos\phi(t)] \quad (1)$$

(where $K$ + constant and $\phi(t)$ + any continuous function of time). The function $f(t)$, or more specifically $\cos\phi(t)$, will be called hereafter a 'sinusoidal function' for short, although the function in itself is naturally not sinusoidal in the proper sense if $\phi(t)$ is non-linear.

Signals of the above-mentioned type are obtained, for example, during the photo-electronic processing of interference fringes in interferometers based on the Michelson principle using moving mirrors (J. Opt. Soc. Am. 47 (1957), 1,097–1,103, or while measuring current in extra high voltage transmission lines by means of a laser current transducer (IEEE J. of Quant. El. Qe-2(1966) 255–259) or in a particular type of interferometer disclosed in Swiss Pat. No. 433,065.

All methods and systems known so far for obtaining the argument of a complex function, as described above, have the disadvantage that they either do not require sufficient accuracy, sensitivity or resolution, or that they have a high energy consumption, or that they are only applicable over limited measuring ranges, or that the system output is non-linearly related to the argument to be recovered.

SUMMARY OF THE INVENTION

Accordingly, one object of this invention is to provide a novel method for electronically obtaining the argument of a complex function.

Another object of this invention is to provide a novel apparatus for electronically obtaining the argument of a complex function.

Yet another object of this invention is to provide a highly accurate method and apparatus for obtaining the argument of a complex function which is applicable over a broad measuring range.

A still further object of the present invention is to provide an improved method and apparatus for obtaining the argument of a complex function which is the output of a transducer having a sinusoidal transfer characteristic.

Another object of this invention is to provide an improved method and apparatus for obtaining the argument of a complex function precisely, wherein ambiguities are eliminated on the basis of periodicity.

Briefly, these and other objects of the invention are achieved according to the invention in that by continuously comparing the function values of a transducer output with a sinusoidally varying reference voltage of known angular frequency and amplitude. The angular frequency of the reference voltage is selected so high that the function value of the transducer output signal remains virtually constant during a cycle of the reference voltage. The amplitude of the reference voltage is chosen equal to the maximum possible amplitude of the signal to be processed. During each half cycle of the reference voltage, comparators are used to generated pulses of widths equal to the time between instants at which the amplitude or the reference voltage is equal to the amplitude of transducer output.

The pulses are processed to recover directly and precisely from a signal, according to equation (1), the argument and the arc $\phi(t)$, respectively, of the sinusoidal function $\cos\phi(t)$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DESCRIPTION OF THE PREFERRED EMBODIMENTS

Figures 1, 1A:
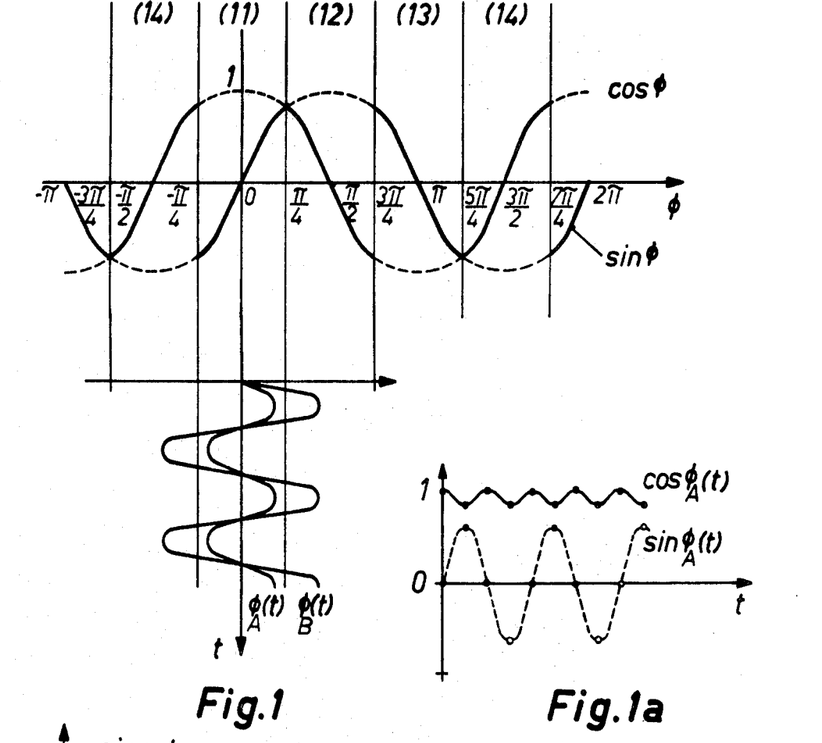
FIG. 1 is a graphical representation of two transducer transfer characteristics $\cos\phi$ and $\sin\phi$, phase-shifted by $\pi/2$ with respect to one another, and further illustrating two different argument functions $\phi_A(t)$ and $\phi_B(t)$.
FIG. 1a is a graphical representation of two transducer output signals $\cos\phi_A(t)$ and $\sin\phi_A(t)$.
Figure 1B:
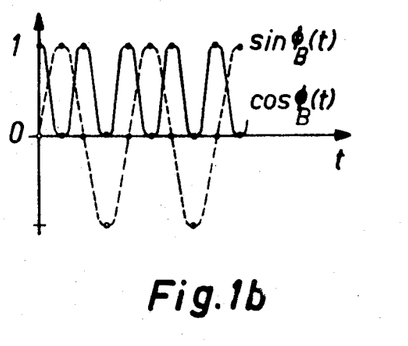
FIG. 1b is a graphical representation of two transducer output signals $\cos\phi_B(t)$ and $\sin\phi_B(t)$.

Referring now to the drawings wherein like reference numerals designate identical or corresponding parts throughout the several views, and more particularly to FIG. 1 thereof, it will be clear that the function $\cos\phi$ can be considered as the transfer characteristic of a transducer having an input function $\phi(t)$. Since it is possible and also customary, for reasons of precision and advantageous further processing, to generate both the function $\cos\phi(t)$, and also the function $\sin\phi(t)$ in devices of the above described type, so that these two transducer output signals are 'in quadrature' (FIGS. 1a and 1b), two transfer characteristics $\cos\phi$ and $\sin\phi$, phase-shifted by $\pi/2$, are shown in FIG. 1.

To facilitate understanding of the invention, two signals $\phi_A(t)$ and $\phi_B(t)$ of different amplitudes are illustrated at the bottom of FIG. 1. After modulation through the transfer characteristics $\cos\phi$ and $\sin\phi$ respectively, the signals produce the signals $\cos\phi_A(t)$ and $\sin\phi_A(t)$, and $\cos\phi_B(t)$ and $\sin\phi_B(t)$ illustrated in FIGS. 1a and 1b.

According to a first aspect of the invention, the sinusoidal transducer output signal [i.e., $\cos\phi_{A,B}(t)$ and/or $\sin\phi_{A,B}(t)$] is compared with a sinusoidal voltage of known amplitude and known angular frequency $\omega$. The amplitude of the reference voltage must be as closely as possible equal to the maximum amplitude $[\sin(\phi = \pi/+ n \cdot \pi)]$ of the transducer output signal, and preferably normalized to be of unit magnitude.

Figure 3:
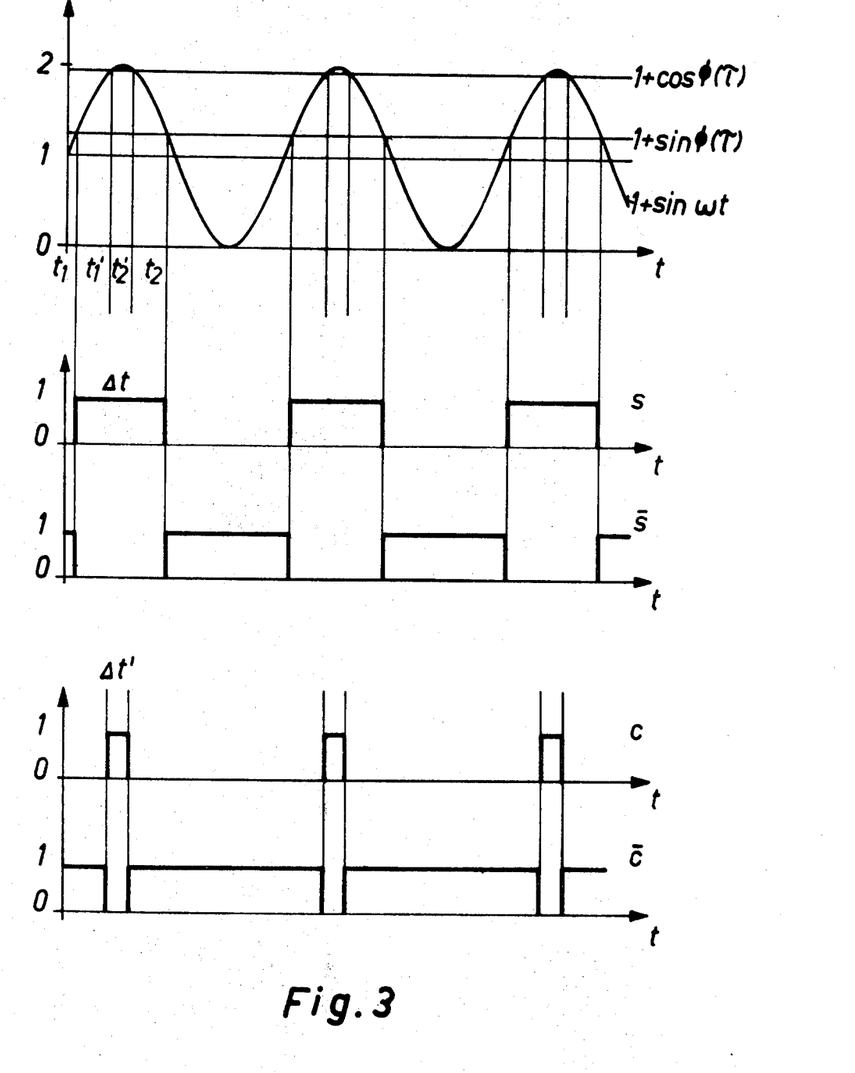
FIG. 3 is a three-part graphical representation of the input functions $\cos\phi(\tau)$ and $\sin\phi(\tau)$ at time $\tau$ in the range $0<\phi<\pi/4$ of the coordinate system of FIG. 1, with the reference function $\sin(\phi t)$, where the ordinate is displaced by one unit (top of figure), with derived time-modulated pulses of normalized amplitude (lower portions of figure)

This comparison determines the instants $t_1$, $t_2$, when amplitude equality exists between the reference signal and the signal to be processed, that is where these two waveforms intersect see FIG. 3. If the value of the function to be processed [for example $\sin\phi(t)$] does not change during a cycle of the reference voltage ($\sin\omega t$), as assumed, the following relationship results:

$$\sin\omega t_1 = \sin\omega t_2 = \sin\phi(t_1) = \sin\phi(t_2) = \sin\phi(\tau) \quad (2)$$

Figure 2:
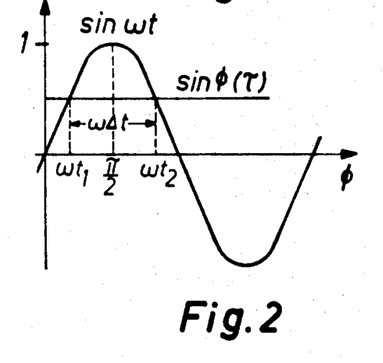
FIG. 2 is a graphical representation of a comparison of a function value $\sin(\phi)$ at time $\tau$ with a reference voltage $\sin(\omega t)$.

An analogous equation applies to $\cos\phi$. As is clear from reference to FIG. 2, the following relationship applies $$\omega t_1 = \pi/2 - \omega\Delta t/2$$

where $\Delta t = t_2 - t_1$. This, together with equation (2) yields:

$$\phi(t) = \pi/2 - \omega\Delta t/2$$

For $\cos\phi$ one obtains correspondingly:

$$\phi(t) = \omega\Delta t/2 \quad (5)$$

Note that a representation of the function $\sin\phi t$ in FIG. 2 as extending through the coordinate-origin, (and the subsequent derivation of the foregoing general relation) is possible, because a displacement of the abscissa by a certain phase angle results in an equal displacement of $\phi$, so that knowledge of the phase angle is not necessary.

By measuring the time interval $\Delta t$ between the two points in time $t_1$ and $t_2$ occurring during each half cycle of the reference voltage, at which the amplitude of the reference voltage equals the amplitude of the signal to be processed, the argument $\phi(t)$ of the transducer output signal [$\sin\phi(t)$ or $\cos\phi(t)$], can thus be represented directly, taking into account, if necessary, a known multiple of $\pi/2$.

As shown in FIG. 3, the time interval $\Delta t$ between the two points $t_1$ and $t_2$, and the time interval $\Delta t'$ between the points $t_1'$ and $t_2'$ are represented by pulses $S$ and $C$ respectively, of normalized amplitude and width proportional to the time interval $\Delta t$ and $\Delta t'$ respectively. Pulse $S$ of width $\Delta t$ is derived from the function $\sin\phi$, and pulse $C$ of the width $\Delta t'$ is derived from the function $\cos\phi$. The signals to be processed $\sin\phi$ and $\cos\phi$, at time $\tau$ again appear as constant d-c voltage levels. In FIG. 3 the signals $1 + \cos\phi$ and $1 + \sin\phi$ are shown instead of the signals $\cos\phi$ and $\sin\phi$. This corresponds to the conditions prevailing in practice, as expressed equation (1). It means mathematically however, only a displacement of the ordinate by one unit, and electronically the addition of a known constant d-c voltage.

A particularly attractive solution for $\phi(t)$, according to the invention, can be described by reference to FIG. 3.

Since both the pulses $S$ and the pulses $C$, are derived as explained above, it is possible to use either the $\cos\phi$ or $\sin\phi$ function for the comparison. This has a considerable advantage for measuring accuracy in that unprecisely defined measuring points $t_1$, $t_2$ or $t_1'$, $t_2'$ can be avoided. Unprecisely defined measuring points are obtained if the function to be discussed is at a point of low rate the reference of change when its amplitude equals that of function. Unprecisely defined measuring points are thus obtained, for example, according to FIG. 3 for the points of intersection of the function $1 + \sin\omega t$ with the function $1 + \cos\phi(\tau)$, while points of intersection of $1 + \sin\omega t$ with $1 + \sin\phi(\tau)$, much better defined intersection points are obtained.

On the basis of the foregoing considerations it is clear that continuously well defined pulse widths for representing the function $\phi(t)$ may be obtained by selecting those pulses which are derived from the sinusoidal function $\sin\phi(t)$ or $\cos\phi(t)$ with the lower absolute values in a particular time interval. This is illustrated in FIG. 1. The respective parts of the characteristics $\cos\phi$, $\sin\phi$, actually used for the comparison are represented by solid lines, those parts that are not used, by broken lines.

Thus, the portions of the transducer characteristics used for the comparison depend on the range of $\phi$, the $\sin\phi-$ or the $\cos\phi-$ characteristic according to the following rules:

$$\frac{-\pi}{4} < (\phi \pm n \cdot \pi) < \frac{+\pi}{4} \rightarrow \sin\phi$$

$$\frac{+\pi}{4} < (\phi \pm n \cdot \pi) < \frac{+3\pi}{4} \rightarrow \cos\phi.$$

FIG. 1 shows, for example, how the rising leg of $\sin\phi$ is used in region 11 between $-\pi/4$ and $+\pi/4$ etc.

Another advantageous aspect of the invention resides in the fact that not only the pulses $S$ and $C$, but also the logically inverted pulses $\overline{S}$ and $\overline{C}$ are generated. These too are illustrated in FIG. 3. For the partial ranges with the limits $\phi_0$, $\pi/4 \pm n \cdot \pi/2$ can thus be used optimal pulses can thus be used for the representation of $\phi(t)$, so that the amplitude of the reference function equals that of the function to be processed at point of high rate of change. As it can be seen, the above indicated limits correspond to the points where $|\sin\phi| = |\cos\phi| = \sqrt{2}/2$. This has the advantage that increasing pulse widths correspond to increasing values of the argument $\phi$, and vice versa.

Observing the foregoing considerations, and referring to FIG. 3, the following d-c voltage levels are obtained:

$$1 + \sin\phi(\tau) \quad (7)$$
$$1 + \cos\phi(\tau) \quad (8)$$
$$1 \quad (9)$$

By means of (9) and an oscillator one generates $$1 + \sin\phi t \quad (10)$$

Then $\omega$ is chosen so high that the function values $\sin\phi$ and $\cos\phi$ change very little within a period $T = (2\pi/\omega)$, even for the fastest change of $\phi$ to be expected.

Referring now to first comparator $C_1$ having input signals of the form defined by equation (7) and (10), may be used to generate the signal $S$ and its logical complements $\overline{S}$ [where $S = 1$ for $(1 + \sin\phi) < (1 + \sin\omega t)$]. Similarly, a second comparator $C_2$ having inputs of the form defined by equations (8) and (10) may be used to generate the corresponding $C$ and $\overline{C}$. Similar considerations as discussed with regard to equations (4) and (5) are valid for the partial ranges 11, 12, 13, 14 in FIG. 1:

$$\omega \int_0^T S\,dt = \phi - (\pi - \phi) = -\pi + 2\phi \quad (13)$$

$$\omega \int_0^T S\,dt = \pi + 2\phi \quad (11)$$

$$\omega \int_0^T C\,dt = 2\phi \quad (12)$$

$$\omega \int_c^T C\,dt = \pi + 2\left(\phi - \frac{3\pi}{2}\right) = 2\phi - 2\pi \quad (14)$$

For other values of $\phi$ there are corresponding formulas. Thus, $2\phi(t)$ can be represented directly by integration of the binary signals $S$, $\overline{S}$, $C$, $\overline{C}$ or by measuring their time length $\Delta t$ taking into account additive multiples of $\pi$. Since different signals are used for the comparison in the various partial ranges, as pointed out above with reference to FIG. 1, the following conditions determinant for the measurement are obtained with the above equations (11) to (14) for the individual partial ranges:

| Range of $\phi$ | $2\phi$ is equal | Range in Fig. 1 and equation Nr, respectively |
|---|---|---|
| $-\frac{\pi}{4} \cdots +\frac{\pi}{4}$ | $-\pi + \overline{S_t}$ | (11) |
| $\frac{\pi}{4} \cdots \frac{3\pi}{4}$ | $C_t$ | (12) |
| $\frac{3\pi}{4} \cdots \frac{5\pi}{4}$ | $\pi + S_t$ | (13) |
| $\frac{5\pi}{4} \cdots \frac{7\pi}{4}$ | $2\pi + \overline{C_t}$ | (14) |

By $S_t$, $C_t$ etc. are meant the signals $S$, $C$ etc. integrated over a cycle of the reference function $\sin(\omega t)$ and multiplied by the known angular frequency $\omega$. For higher and lower values of $\phi$ corresponding multiples of $2\pi$ are added.

Figure 4:
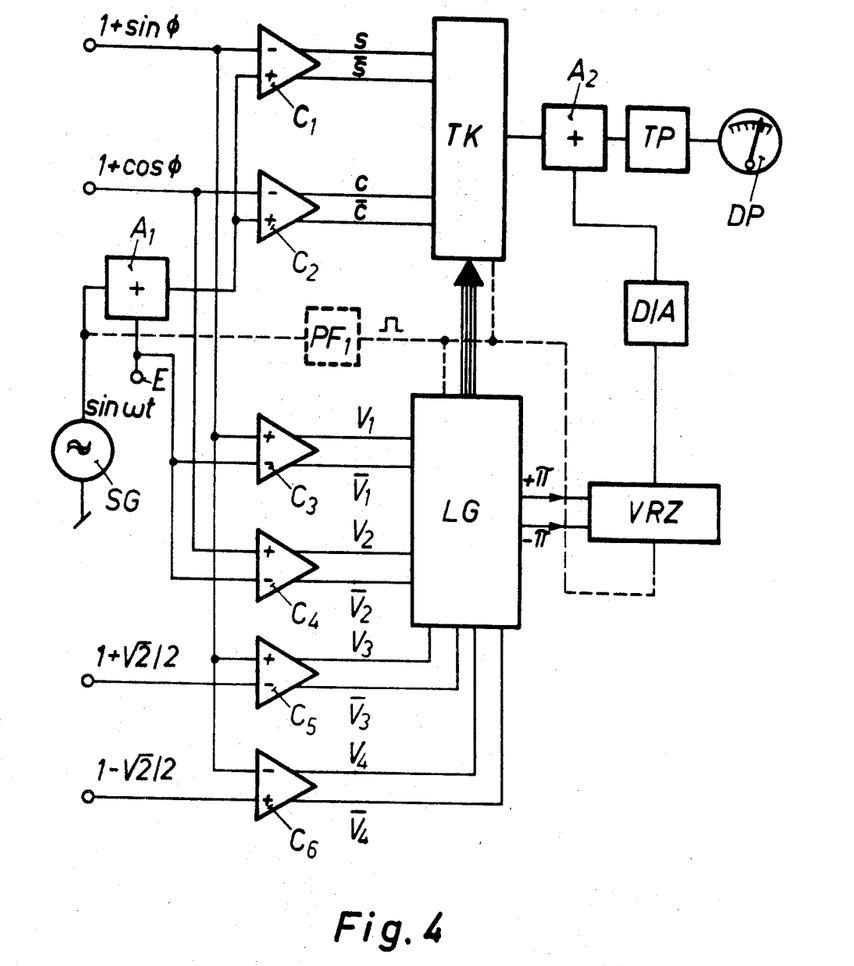
FIG. 4 is a block diagram of an apparatus for recovering the argument $\phi(t)$ of input signals $1 + \sin\phi$ and $1 + \cos\phi$ entering on two channels.

For producing the electronic representation of $2\phi(t)$ according to the foregoing table, particularly if $2\phi(t)$ varies by more than $\pi$, the transition from one partial range to the next may be detected by comparators with attached direction or polarity discriminators, and may be taken into account by addition or subtraction of $\pi$ using a reversible counter, such as VRZ of FIG. 4.

A logic network for carrying out the signal processing method described above is shown in FIG. 4.

Referring again to FIG. 4a sinusoidal input voltage $1+\sin\phi(t)$ is fed to a first comparator $C_1$ and a sinusoidal input voltage $1+\cos\phi(t)$ is fed to a second comparator $C_2$. The reference voltage $(1+\sin\omega t)$, produced by a generator SG and a 'unit' voltage source E the outputs of which are summed in a first adder $A_1$, is also fed to both comparators $C_1$ and $C_2$. The comparators $C_1$, $C_2$ both have complementary outputs. The unit voltage S or C is generated at the outputs of the comparators $C_1$ or $C_2$, respectively, if $(1+\sin\phi) < (1+\sin\omega t)$, and if $(1+\cos\phi) < (1+\sin\omega t)$ respectively. In the opposite case a0 voltage appears. At the outputs $\bar{S}$, $\bar{C}$ the respective logically inverted or complement voltages are generated.

The outputs $S$, $C$, $\bar{S}$, $\bar{C}$ are fed into a combination gate TK which is so controlled by the combinatorial logic LG that only one of the outputs of the comparators $C_1$, $C_2$ is connected through to a second adder $A_2$. The output signals of comparators $C_3$, $C_4$, $C_5$ and $C_6$ feed the combinatorial logic LG. The comparators $C_3$, $C_4$ with outputs $V_1$, $\bar{V}_1$ and $V_2$, $\bar{V}_2$ compare the respective function values $(1+\sin\phi)$ and $(1+\cos\phi)$ with unit voltage 1. They thus determine the signs of $\sin\phi$ and $\cos\phi$ respectively.

The comparator $C_5$ with the outputs $V_3$, $\bar{V}_3$ compares the function value $[1+\sin\phi(t)]$ with the fixed value $[1+\sqrt{2/2},]$ and comparator $C_6$ with the outputs $V_4$, $\bar{V}_4$ compares the value $[1+\sin\phi(t)]$ with the fixed value $[1-\sqrt{2/2}]$. When using the $\cos\phi$ channel, the appropriate corresponding constant voltages are used. The voltage value at the output $V_3$ of the comparator $C_5$ is thus 1, if $+\pi/4 < \phi(t) \pm N\cdot 2\pi < +3\pi/4$. Correspondingly, the voltage value at the output $V_4$ of comparator $C_6$ is 1, if $5\pi/4 = \phi(t) \pm n\cdot 2\pi < 7\pi/4$. The combination of the outputs of $C_4$ and $C_4$ permits the identification of the boundaries $\phi_a = \pi/4 \pm N\cdot\pi/2$ according to FIG. 1. If $\phi(t)$ exceeds such a boundary, the output signal of either $C_5$ or $C_6$ will switch. The direction of switching of the logical output signal of $C_5$ or $C_6$ together with the identification of the boundary by $C_3$ or $C_4$ permits the logic circuit LG to determine whether $\phi(t)$ has passed through a certain boundary in an increasing or decreasing direction. If a boundary $\phi_a$ is passed in positive direction, the counter VRZ receives an incrementing pulse. In the opposite case a decrementing pulse is generated. One count thus corresponds to $/2\phi/=\pi$.

Incrementing pulses are generated for changes of range under the following conditions:

$(11) \rightarrow (12): V_1 = 1, V_2 = 1, V_3$ becomes 1    (15)
$(12) \rightarrow (13): V_1 = 1, V_2 = 0, V_3$ becomes 0    (16)
$(13) \rightarrow (14): V_1 = 0, V_2 = 0, V_4$ becomes 1    (17)
$(14) \rightarrow (11): V_1 = 0, V_2 = 1, V_4$ becomes 0    (18)

Decrementing pulses are generated for:

$(11) \rightarrow (14): V_1 = 0, V_2 = 1, V_4$ becomes 1    (19)
$(14) \rightarrow (13): V_1 = 0, V_2 = 0, V_4$ becomes 0    (20)
$(13) \rightarrow (12): V_1 = 1, V_2$ 0, $V_3$ becomes 1    (21)
$(12) \rightarrow (11): V_1 = 1, V_2 = 1, V_3$ becomes 0    (22)

Figure 5:
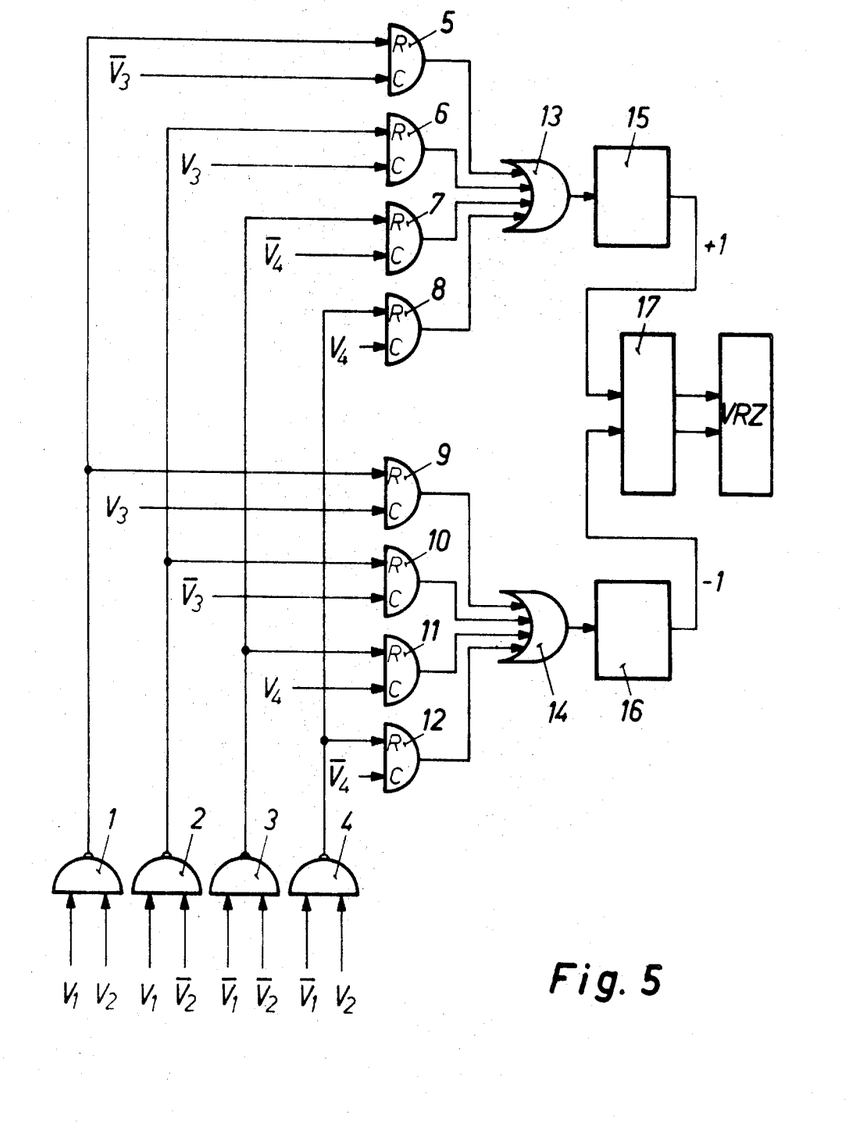
FIG. 5 is a detailed logic diagram of the combinatorial circuit LG of FIG. 4.

A more detailed illustration of the logic LG, satisfying the foregoing conditions (15)–(22) is illustrated in FIG. 5:

The signals $V_1$, $V_2$, $V_3$ and $V_4$ and their logical complements $\bar{V}_1$, $\bar{V}_2$, $\bar{V}_3$ and $\bar{V}_4$ form the comparators $C_3$, $C_4$, $C_5$ and $C_6$ are fed, as shown in FIG. 5, to NAND-gates 1, 2, 3, 4 and to modified AND-gates 5, 6, 7, 8, 9, 10, 11 and 12, respectively. The interconnections of the above mentioned NAND-gates with the above-mentioned modified AND-gates are also clearly shown in FIG. 5.

The modified AND-gates 5 ... 12 are designed so that, depending on the static voltage at one input, only voltage transients of a specified direction or polarity applied at the other input are transmitted.

Figures 6, 7:
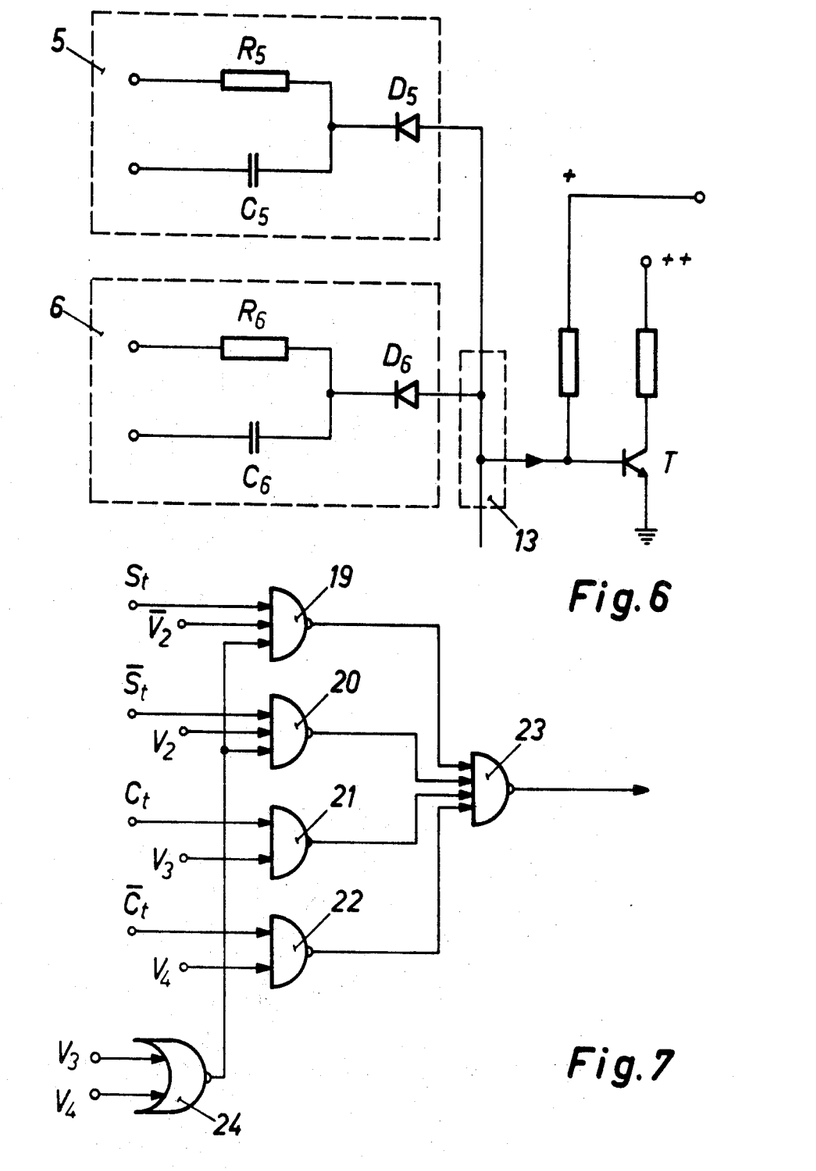
FIG. 6 is a circuit diagram of the modified AND-gates of FIG. 5.
FIG. 7 shows a logic diagram of the gating circuit TK according to FIG. 4.

The circuit of such a modified AND-gate is shown in FIG. 6. The gates 5 and 6 of FIG. 5 are indicated by y broken outlines. These gates have at one input a resistor ($R_5$, $R_6$) and at the other a capacitor ($C_5$, $C_6$) which are coupled to a diode ($D_5$, $D_6$). For the diode direction shown, only negative voltage transients at the capacitor inputs of the gates can be transmitted to the outputs, depending on the voltages at the resistor inputs. Positive voltage transients at the capacitor inputs and voltage transients of both directions at the resistor inputs have no effect on the outputs. With these gates, the transients of $V_3$ and $V_4$ can be detected selectively.

The logic network illustrated in FIG. 5 yields incrementing pulses according to the foregoing conditions (15) ... (18) through the gates 5 ... 8, and decrementing pulses according to the conditions (19) ... (22) through the gates 9 ... 12.

The outputs of the gates 5 ... 8 are fed to an OR-gate 13, those of the gates 9 ... 12 to an OR-gate 14. On the basis of the above described circuits for the AND-gates 5 ... 12, these OR-gates can be implemented by simply connecting the AND-gate outputs with each other, as shown for gates 5 and 6 in FIG. 6. The OR-gates 13, 14 represented separately in FIG. 5 for the sake of clarity, are therefore actually part of the modified AND-gates 5 ... 8 and 9 ... 12 respectively.

The pulses passing through the OR-gates 13, 14 are then reshaped in the monostable multivibrators 15, 16 to form well-defined pulses. The multivibrator 15 generates the incrementing pulses for positive counting of reversible counter VRZ, the multivibrator 16 the decrementing pulses for negative counting. The transistor stage T indicated in FIG. 6 is part of such a multivibrator.

FIG. 5 shows also an anti-coincidence circuit 17. The latter prevents simultaneous transmission of an incrementing pulse from multivibrator 15 and a decrementing pulse, from multivibrator 16 caused by a change of direction of $\phi(t)$ close to a boundary $\phi_a$, to the counter VRZ. The counter VRZ thus has only to process those counting pulses which have a certain minimum time separation.

The common action of comparators $C_3$ to $C_6$ on the logic LG, and control of the counter VRZ by means of the latter thus has the effect that the correct multiple of $\pi$ belonging to the corresponding partial range (11, 12, 13, 14) etc. of FIG. 1 is always available in the counter VRZ. For example, the counter VRZ is within partial range 11 (reset position) at −1, corresponding to $<\pi$.

The sinusoidal generator SG can serve as a clock by forming corresponding clock pulses by means of a pulse shaper (e.g. Schmitt trigger) $PF_1$ FIG. 4, so that synchronization of the switching elements in LG and VRZ is possible. The multiples of $\pi$ in the counter VRZ are converted to an analog voltage in a digital-analog converter D/A and added to the signals $S$, $\bar{S}$, $C$ or $\bar{C}$ passing through the combination gate TK in the second adder $A_2$.

The gating circuit TK selects, as indicated above, (after identification of the correct partial range (11), (12), (13) or (14) according to FIG. 1) only one of the quantities $S_t$, $\bar{S}_t$, $C_t$ or $\bar{C}_t$ according to the above represented relation 11, 12, 13 and (, and transmits it as undistorted as possible to the adder $A_2$. The details of the gating circuit TK are shown more clearly in FIG. 7. It consists of the NAND-gates 19, 20, 21, 22, 23 and a NOR-gate 24, which are interconnected in the manner illustrated. To these gates are fed the signals $S_t$, $\bar{S}_t$, $C_t$, $\bar{C}_t$, and the signals $V_2$, $\bar{V}_2$, $V_3$ and $V_4$ from the comparators $C_4$, $C_5$ and $C_6$, in the manner shown in FIG. 7. The circuit operates according to the following rules:

| control signals | range | transmitted signal |
|---|---|---|
| $V_2 = 1, V_3 = 0, V_4 = 0$ | (11) | $\bar{S}_t$ |
| $V_3 = 1$ | (12) | $C_t$ |
| $V_2 = 0, V_3 = 0, V_4 = 0$ | (13) | $S_t$ |
| $V_4 = 1$ | (14) | $\bar{C}_t$ |

The details of the circuits represented in FIGS. 4, 5, 6, 7 for carrying out the method according to the invention can be modified, for example, so that not only one of the two input channels is compared with the (e.g. voltages $1+\sqrt{2/2}$ and $1-\sqrt{2/2}$ by means of $C_5$ and $C_6$, but both input channels are compared with the above-mentioned constant voltages. To this end, two additional comparators are required. With the additional signals obtained from these comparators one can simplify the logic LG and the gating circuit TK illustrated in FIGS. 5, 6, 7. But this circuit configuration is less advantageous than the preferred one illustrated in the figures, if the transducer characteristics $\cos\phi$ and $\sin\phi$ are not ideal (e.g. having quadrature errors), since in this case ambiguities can arise more easily when a range limit $\phi_a$ is passed. Since at least minor errors are unavoidable in practice, the circuits illustrated in FIGS. 5, 6, 7 is generally preferred.

In order to take into account the constant factor ω [see equations (11), (12), (13), (14)], the output of the digital/analog converter D/A is adapted to the output of the gating circuit TK. The output signal of the gating circuit TK is a pulse-width modulated signal with normalized amplitude. In reset position, ($\phi = 0$), the output signal of the gating circuit TK, integrated over a period T, yields half of the normalized amplitude. The output signal of the digital-analog converter is so adjusted that a variation of the counter reading of the counter VRZ by one unit causes a variation of the analog output of the converter D/A by half the normalized amplitude. The output signals of the converter D/A and of the gating circuit TK thus defined are then added in the second adder $A_2$. The pulsewidth-modulated summation signal is then averaged in a lowpass filter TP.

In reset position ($\phi = 0$), counter VRZ is at −1. The output signal of the converter D/A is then −½ normalized amplitude. The output of the gating circuit TK compensates in this state the mean value at the output of the lowpass filter TP to OV. The signal at the output of the lowpass filter TP then corresponds with $\phi(t)$. It can be measured and displayed by an indicator instrument DP, such for example, as an oscillograph, or oscilloscope.

Delays in switching, for example, from S to C ($\phi \approx \pi/4$) result in no additional errors, since both functions yield the same result, provided that counter VRZ can follow correctly.

Compared to the known measuring systems, particularly that disclosed in Swiss Pat. No. 433,065 for high voltage transmission lines, the method according to the present invention, and the circuits disclosed for carrying out this method have the advantages, among others, that no multipliers are used and the resolution is so high that even minute intensity differences of the light beams detected by the photosensors can be measured accurately.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for electronically obtaining the argument of an output signal generated by a transducer having a sinusoidal transfer characteristic, comprising the steps of:

developing a first output signal using said transducer;

generating a reference voltage having an angular frequency which is sufficiently high so that said first output signal remains substantially constant during one cycle of said reference voltage, and having an amplitude equal to the maximum amplitude of said first output signal, comparing said first output signal with said reference voltage for determining points in time during each half cycle of said reference voltage at which said first output signal and said reference voltage are of equal amplitude; and, electronically producing a first pulse having a width proportional to a time interval defined by said points in time at which said first output signal and said reference voltage are of equal amplitude, whereby said first pulse is proportional to an instantaneous value of said argument.

2. A method for electronically obtaining the argument of an output signal generated by a transducer having a sinusoidal transfer characteristic, as in claim 1, further comprising the steps of:

developing a second output signal, shifted in phase by $\pi/2$ with respect to said first signal, using said transducer;

comparing said second output signal with said reference voltage for determining points of time during each half cycle of said reference voltage at which said first output signal and said reference voltage are of equal magnitude; and, electronically producing a second pulse having a width proportional to a time interval defined by points in time at which said second output signal and said reference voltage are of equal amplitude.

3. A method for electronically obtaining the argument of an output signal generated by a transducer having a sinusoidal transfer characteristic, as in claim 2, further comprising the step of:

comparing said first and second pulses to determine which has a smaller absolute value; and, electronically selecting whichever of said pulses has a smaller absolute value for representing an instantaneous value of said argument.

4. A method for electronically obtaining the argument of an output signal generated by a transducer having a sinusoidal transfer characteristic, as in claim 3, further comprising the step of:

generating pulses which are the logical complements of said first and second pulses.

5. A method for electronically obtaining the argument of an output signal generated by a transducer having a sinusoidal transfer characteristic, as in claim 4, wherein:

said step of generating pulses includes the step of normalizing the amplitudes of said pulses.

6. A method for electronically obtaining the argument of an output signal generated by a transducer having a sinusoidal transfer characteristic, according to claim 4, further comprising the steps of:

electronically sensing whether said transducer output signals are increasing or decreasing for increasing values of said argument; and, selecting either said first and second pulses or said pulses which are the logical complements of said first and second pulses for instantaneous representation of said argument depending on whether said transducer output signals are increasing or decreasing.

7. A method for electronically obtaining the argument of an output signal generated by a transducer having a sinusoidal transfer characteristic, according to claim 6, further comprising the step of:

recording a count of appropriate sign in a reversible counter in response to said step of selecting.

8. A method for electronically obtaining the argument of an output signal generated by a transducer having a sinusoidal transfer characteristic, according to claim 7, further comprising the step of:

controlling said reversible counter in response to a comparison of output signals from said transducer with selected constant voltages.

9. A logic network for electronically obtaining the argument of an output signal generated by a transducer having a sinusoidal transfer characteristic, comprising:

means for generating a reference voltage, said reference voltage having a frequency which is sufficiently high so that said transducer output signal remains substantially constant during one cycle of said reference voltage and having an amplitude equal to the maximum amplitude of said transducer output signal;

first comparator means having a plurality of input terminals, said reference voltage and said transducer output signal applied to said input terminals;

said comparator means generating output pulses representing instants of equal but changing amplitude in said signals applied at said input terminals;

low-pass filter means coupled to said first comparator means for filtering said output pulses thereof, whereby a signal representative of said argument is produced; and, utilization means coupled to said low-pass filter means for utilizing output signals thereof.

10. A logic network for electronically obtaining the argument of an output signal generated by a transducer having a sinusoidal transfer characteristic as in claim 9, further comprising:

second comparator means for generating output pulses which are logical complements of said output pulses generated by said first comparator means; and, controlling logic coupled between said first and second comparator means and said utilization means for selectively transmitting said output pulses of either said first or second comparator means to said utilization means.

11. A logic network for electronically obtaining the argument of an output signal generated by a transducer having a sinusoidal transfer characteristic as in claim 10, wherein:
said controlling logic means includes third comparator means for comparing said transducer output signal with a plurality of constant voltage levels.

12. A logic network for electronically obtaining the argument of an output signal generated by a transducer having a sinusoidal transfer characteristic as in claim 11, further comprising:
reversible counter means coupled to said controlling logic;
digital-to-analog converter means coupled to the output of said reversible counter means for converting the output of said reversible counter means to an analog voltage; and,
adder means coupled to said digital-to-analog converter for combining the output of said digital-to-analog converter with output pulses selectively transmitted by said controlling logic.

13. A logic network for electronically obtaining the argument of an output signal generated by a transducer having a sinusoidal transfer characteristic as in claim 12, further comprising:
pulse shaper means coupled to said reference voltage generating means for producing clock pulses;
said pulse shaper means coupled to said controlling logic and to said reversible counter means for synchronizing said controlling logic and said reversible counter means.

* * * * *

UNITED STATES PATENT OFFICE
CERTIFICATE OF CORRECTION

Patent No. __3,678,399__  Dated __July 18, 1972__

Inventor(s)  __FRANCOIS MOTTIER ET AL__

It is certified that error appears in the above-identified patent and that said Letters Patent are hereby corrected as shown below:

Column 1, line 9, change "electrically" to --electronically--;

Line 20, after "argument" insert --function--;

Line 22, after "form", change the "," to --:--;

Line 24, change "+", both instances, to --=--;

Line 33, after "-1,103", insert --)--;

Line 39, delete "require" and insert therefor --have--;

Line 40, delete "have" and insert therefor --require--;

Line 66, delete "according to the invention in that";

Line 75, change "generated" to --generate--.

Column 2, line 2, change "or" to --of--;

Line 3, before "transducer" insert --the--;

Line 4, change "The" to --These--;

Line 29, change "$\phi$" to --$\omega$--;

UNITED STATES PATENT OFFICE
CERTIFICATE OF CORRECTION

Patent No. 3,678,399　　　　　　　Dated July 18, 1972

Inventor(s)　FRANCOIS MOTTIER ET AL　　　　　PAGE 2

It is certified that error appears in the above-identified patent and that said Letters Patent are hereby corrected as shown below:

Line 60, before "signals", insert --output--, after "(t)", last instance, and before "il-", insert --,--;

Line 67, change formula to read $\sin(\phi = \pi/2 + n \cdot \pi)$.

Column 3, line 4, after the equation, add --(3)--;

Line 6, after the equation, add --(4)--;

Line 32, after "expressed", add --in--;

Line 33, after "mathematically", insert --,--;

Line 45, delete "discussed" and insert therefor --processed--, delete "the reference";

Line 46, after "of", insert --the reference--;

Line 49, after "while", insert --for--;

Line 56, change "values" to --value--;

Line 62, delete ",", and insert therefor --. More specifically, either--;

UNITED STATES PATENT OFFICE
CERTIFICATE OF CORRECTION

Patent No. __3,678,399__   Dated __July 18, 1972__

Inventor(s) __FRANCOIS MOTTIER ET AL__        PAGE 3

It is certified that error appears in the above-identified patent and that said Letters Patent are hereby corrected as shown below:

Line 63, after "characteristic", insert --is used,--;

Line 70, after "+$\pi/4$", insert --, and the falling leg of $\cos\phi$ in region 12 between +$\pi/4$ and 3$\pi/4$--;

Line 74, after "$\phi_g$", insert --=--;

Line 75, before "$\pi/2$", delete "(", after "$\pi/2$", delete "can thus be used".

Column 4, line 13, after "Then", insert --,--;

Line 14, delete "()" from around "2$\pi/\omega$";

Line 16, before "first comparator", add --FIG. 4, a--, after "$C_1$", insert --,--;

Line 17, change "equation" to --equations--;

Line 18, before "signal", insert --binary--, change "complements" to --complement--;

Line 21, before "C and $\bar{C}$", insert --signals--;

Equation (11), change "Sdt" to --$\bar{S}$dt--;

Equation (14), change "Cdt" to --$\bar{C}$dt--;

Column 5, line 3, after "FIG 4", delete "$a$", and insert

UNITED STATES PATENT OFFICE
CERTIFICATE OF CORRECTION

Patent No. 3,678,399           Dated  July 18, 1972

Inventor(s)  FRANCOIS MOTTIER ET AL           PAGE 4

It is certified that error appears in the above-identified patent and that said Letters Patent are hereby corrected as shown below:

--, a--;

Line 7, after "E", insert --,--;

Line 11, between "$C_1$" and "$C_2$", delete "or" and insert therefor --and--;

Line 13, after "$\overline{C}$", insert --,--;

Line 25, before " ]", second instance, delete "," and insert --,-- after " ]" second instance;

Line 30, change "N" to --n--;

Line 32, after "$5\pi/4$" change "=" to -- < --;

Line 33, change "$C_4$" first instance, to --$C_3$--;

Line 34, change "N" to --n--;

Line 54, after "$V_2$", insert --=--;

Line 60, delete "form" and insert therefor --from--;

Line 71, after "by", delete "y".

Column 6, line 3, after "$V_4$" delete "$_1$";

Line 37, delete "$<\pi$" and insert therefor -- — $\pi$ --;

FORM PO-1050 (10-69)                              USCOMM-DC 60376-P69
                                      ☆ U.S. GOVERNMENT PRINTING OFFICE : 1969 O—366-334.

UNITED STATES PATENT OFFICE
CERTIFICATE OF CORRECTION

Patent No. 3,678,399                    Dated July 18, 1972

Inventor(s) FRANCOIS MOTTIER ET AL                    PAGE 5

It is certified that error appears in the above-identified patent and that said Letters Patent are hereby corrected as shown below:

Line 51, "(" should read -- 14 --;

Line 53, before "NAND-gates", delete "the";

Line 67, delete "(e.g." and insert therefor --constant--.

Column 7, line 18, before "counter", delete ",";

Line 24, after "such" insert --,--;

Line 26, change "S" to --$\overline{S}$--.

Signed and sealed this 8th day of May 1973.

(SEAL)
Attest:

EDWARD M. FLETCHER, JR.                ROBERT GOTTSCHALK
Attesting Officer                      Commissioner of Patents